US006202488B1

United States Patent
Cash

(10) Patent No.: US 6,202,488 B1
(45) Date of Patent: Mar. 20, 2001

(54) VEHICLE ROLLOVER SENSOR

(75) Inventor: Steven M. Cash, Walled Lake, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 08/766,531

(22) Filed: Dec. 13, 1996

(51) Int. Cl.[7] ............................ G01M 15/00; B60R 21/13
(52) U.S. Cl. ........................................ 73/514.26; 33/366.23
(58) Field of Search .................................. 73/116, 117.2, 73/117.3, 118.1, 514.01, 514.21, 514.22, 514.23, 514.24, 514.26, 514.31, 514.35; 701/1, 4, 31, 45; 33/366.23

(56) References Cited

U.S. PATENT DOCUMENTS

| 2,265,149 | 12/1941 | Crane et al. ........................ 250/41.5 |
| 3,835,273 | 9/1974 | Stolarik .............................. 200/61.48 |
| 3,971,934 | 7/1976 | Coatta et al. ........................ 250/225 |
| 4,159,577 | 7/1979 | Bergkvist ............................... 33/366 |
| 4,492,029 | 1/1985 | Tanaka et al. .......................... 33/366 |
| 4,565,010 | 1/1986 | Herman .................................. 33/366 |
| 4,784,237 | 11/1988 | Condne et al. ...................... 180/268 |
| 4,798,087 | 1/1989 | Takeda et al. .......................... 73/649 |
| 5,029,473 | * 7/1991 | Jost et al. ........................ 73/516 LM |
| 5,391,845 | 2/1995 | Haas et al. .................... 200/61.45 R |
| 5,825,284 | * 10/1998 | Dunwoody et al. ................. 340/440 |
| 5,890,084 | * 3/1999 | Halasz et al. ......................... 7015/45 |
| 5,918,282 | * 6/1999 | Schwager et al. ..................... 73/758 |

FOREIGN PATENT DOCUMENTS

| 2374617 | 7/1978 | (FR) . |
| 2640042 | 6/1990 | (FR) . |
| 3703630 | 8/1988 | (GB) . |
| 4106932 | 9/1992 | (GB) . |
| 08705570 | 9/1987 | (WO) . |

* cited by examiner

*Primary Examiner*—George Dombroske
(74) *Attorney, Agent, or Firm*—Tarolli, Sundheim, Covell, Tummino & Szabo L.L.P.

(57) ABSTRACT

A vehicle rollover sensor (10) includes an optical transmitter (80) for providing a light beam (86) extending in a first direction (36) and an optical receiver (90) for receiving the light beam. A movable member (40) when in a first orientation enables the light beam (86) from the optical transmitter (80) to be directed to the optical receiver (90). The movable member (40) when in a second orientation prevents at least a part of the light beam (86) from being directed to the optical receiver (90). The movable member (40) is supported on the vehicle for movement between the first and second orientations in a direction transverse to the first direction (36), in response to rolling movement of the vehicle of a predetermined amount relative to the first direction. An inertia mass (60) is connected with the movable member (40) to maintain the movable member in a predetermined orientation relative to the ground surface on which the vehicle is disposed. The operativeness of the sensor (10) can be tested whenever the vehicle is not in a rollover condition.

8 Claims, 4 Drawing Sheets

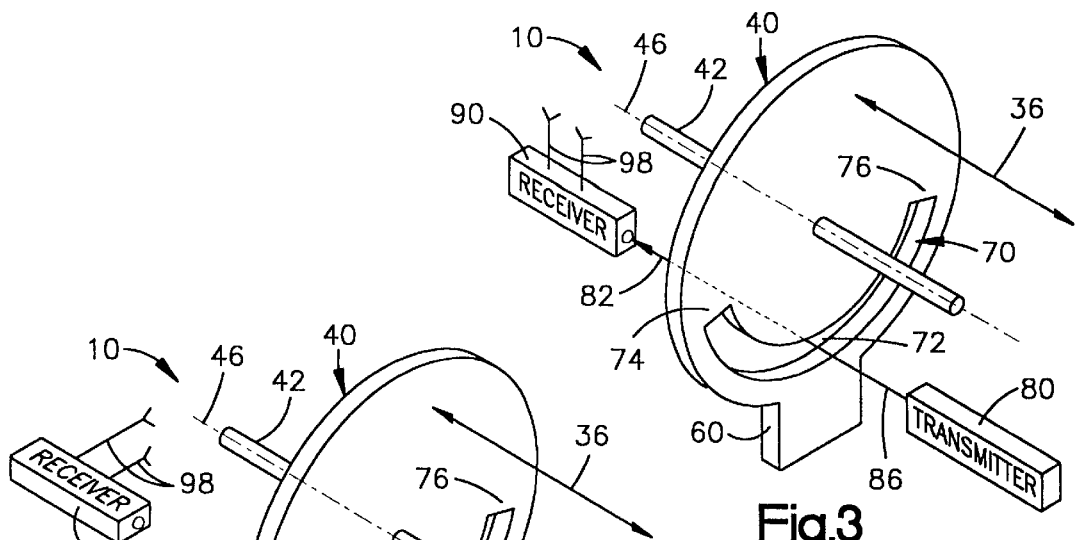
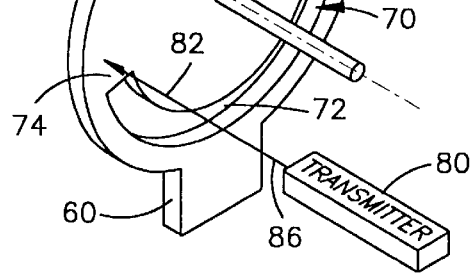
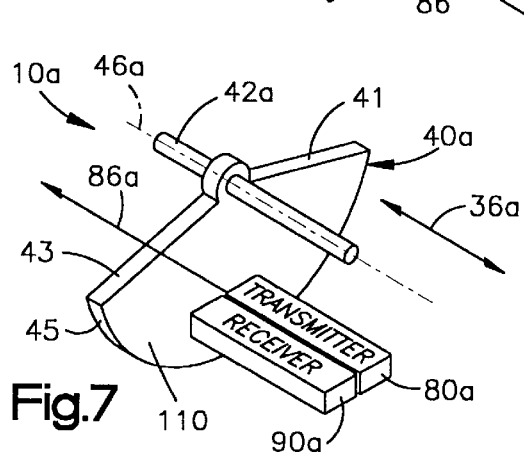
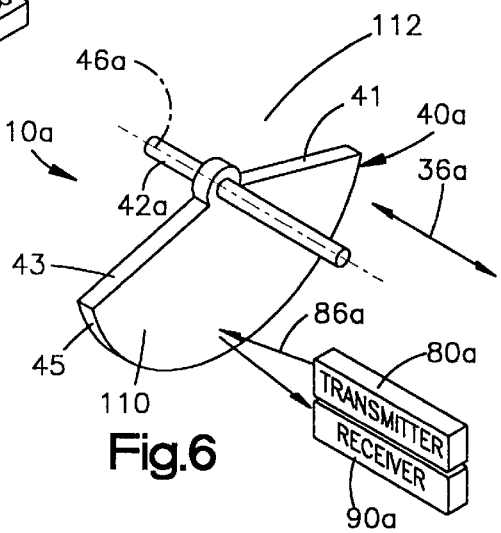
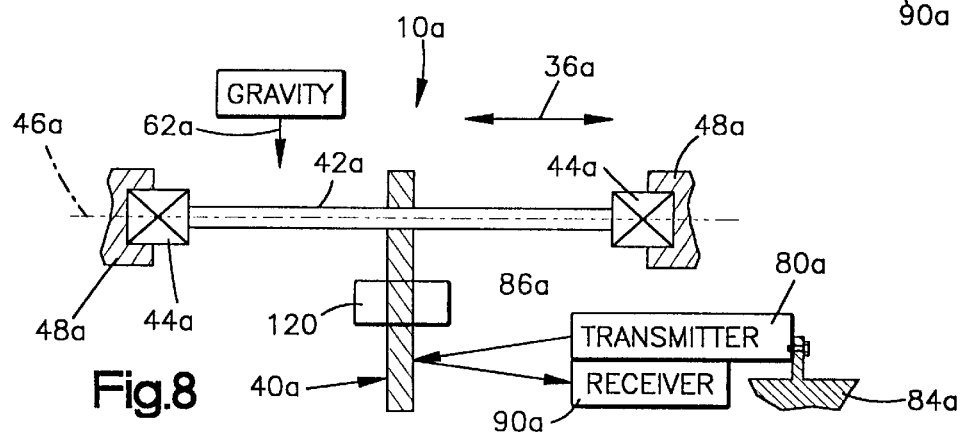

VEHICLE ROLLOVER SENSOR

BACKGROUND OF THE INVENTION

1. Technical Field

The present invention relates to an apparatus for providing a control signal indicative of a rollover condition of a vehicle. The control signal is preferably used to actuate a vehicle occupant protection device, such as a pretensioner for a vehicle seat belt.

2. Description of the Prior Art

It is known to sense movement of a vehicle, such as tilting or rolling movement, for use in automatically actuating a safety device in a motor vehicle.

SUMMARY OF THE INVENTION

The present invention is an apparatus for providing a control signal indicative of a rollover condition of a vehicle which is disposed on a ground surface. The apparatus comprises an optical transmitter for providing a light beam extending in a first direction, and an optical receiver for receiving the light beam from the optical transmitter. The apparatus further comprises a disk having an opening for enabling the light beam from the optical transmitter to be directed to the optical receiver. The disk has portions for preventing at least a part of the light beam from being directed to the optical receiver. The optical transmitter and optical receiver are supported on the vehicle for movement relative to the disk and transverse to the first direction in response to rolling movement of the vehicle relative to the first direction. The disk is supported on the vehicle for movement relative to the vehicle and transverse to the first direction in response to rolling movement of the vehicle relative to the first direction in an amount above a predetermined threshold value, to prevent at least a part of the light beam from being directed to the optical receiver. An inertia mass is connected with the disk to maintain the disk in a predetermined orientation relative to the ground surface on which the vehicle is disposed when the vehicle is in a rollover condition. The opening in the disk enables the light beam from the optical transmitter to be directed to the optical receiver whenever the vehicle is not in a rollover condition.

In a preferred embodiment, the disk is supported on the vehicle for pivotal movement about an axis. The opening comprises a single arcuate slot centered on the axis and extending between end boundary portions of the disk, which can prevent at least a part of the light beam from being directed to the optical receiver. The apparatus further comprises means for testing the operativeness of the optical transmitter and the optical receiver whenever the vehicle is not in a rollover condition. The means for testing includes means for controlling the amount of light output of the optical transmitter in response to the testing of the optical transmitter and the optical receiver.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic perspective view of portions of the sensor of FIG. 1, shown when the vehicle is not in a rollover condition;

FIG. 4 is a view similar to FIG. 3 showing the same portions of the sensor when the vehicle is in a rollover condition;

FIG. 6 is a schematic view, partially in section, of portions of a sensor which is constructed in accordance with a second embodiment of the present invention; and FIG. 7 is a view similar to FIG. 6 showing the same portions of the sensor when the vehicle is in a rollover condition;

FIG. 8 is a view similar to FIG. 2 of the sensor apparatus of FIG. 5;

DESCRIPTION OF PREFERRED EMBODIMENTS

Figure 1:
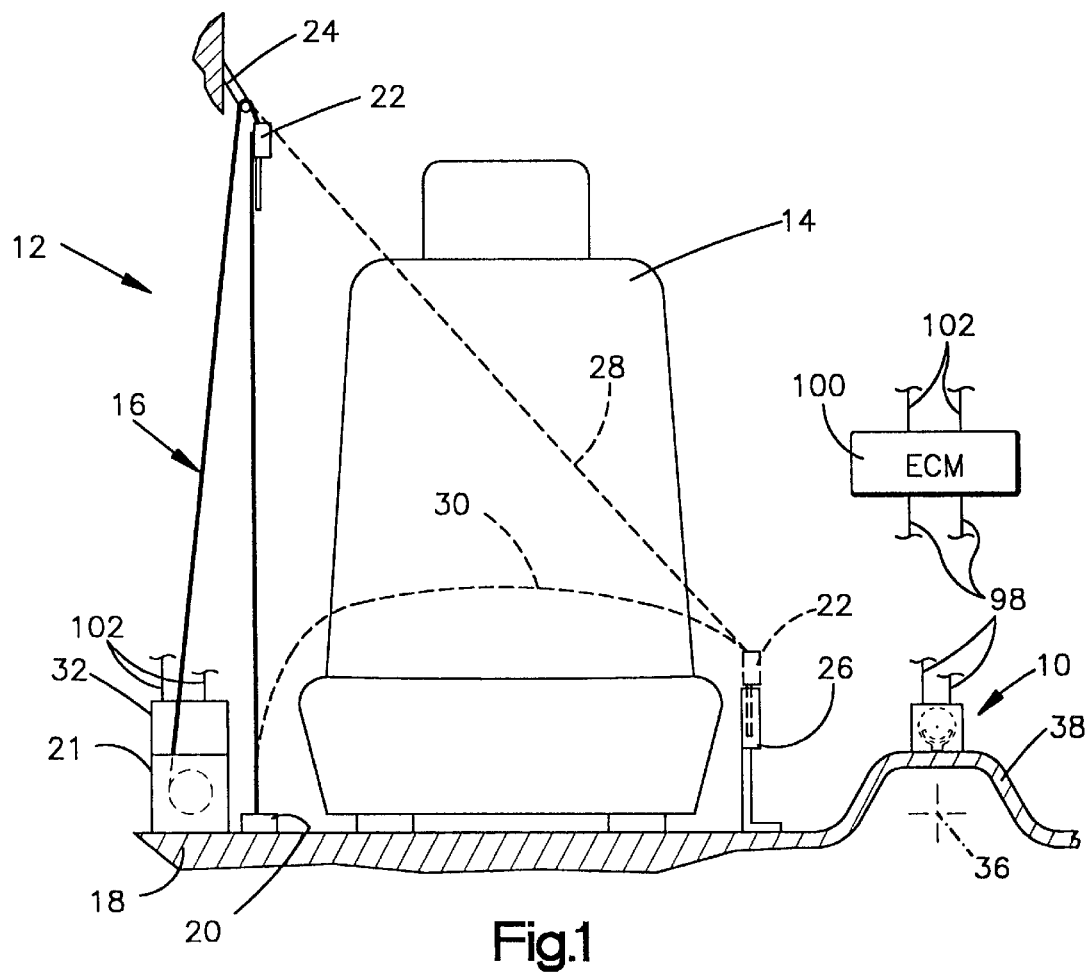
FIG. 1 is a schematic illustration of a vehicle seat, a seat belt system for helping to protect an occupant of the seat, and a rollover sensor which is constructed in accordance with a first embodiment of the present invention.
Figure 2:
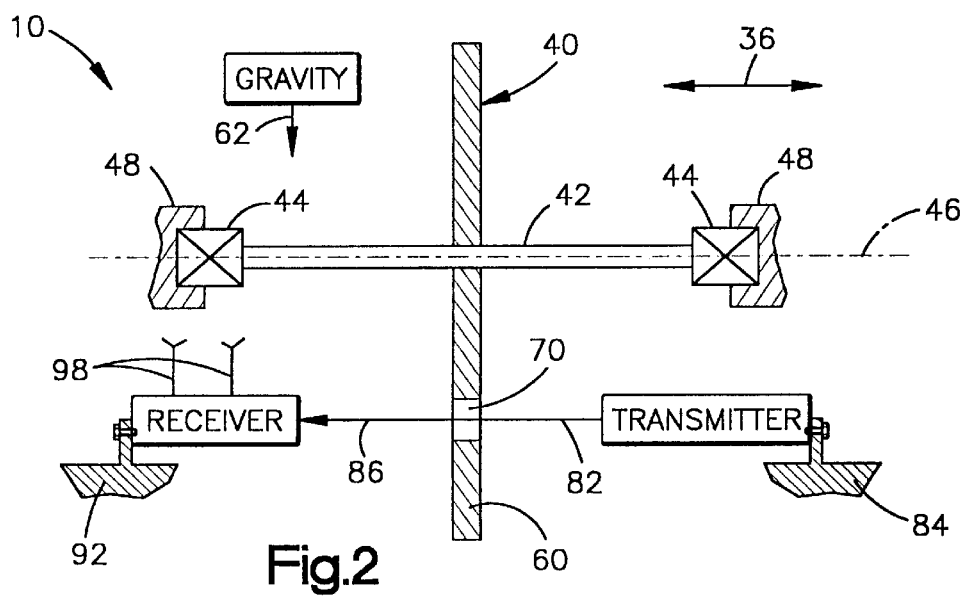
FIG. 2 is a schematic view, partially in section, of the sensor of FIG. 1.

The present invention relates to an apparatus for providing a control signal indicative of a rollover condition of a vehicle. The control signal is preferably used to actuate a vehicle occupant protection device such as an air bag or a pretensioner for a vehicle seat belt. As representative of the present invention, FIGS. 1–4 illustrate schematically a rollover sensor 10.

The sensor 10 is electrically connected with a pretensioner 32. The pretensioner 32 is associated with a three-point continuous loop seat belt system 12 (FIG. 1) for use in restraining an occupant of a vehicle. During operation of the vehicle, the occupant of the vehicle sits on a seat 14 in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 21 which is secured to the vehicle body on the same side of the seat 14 as the anchor point 20. Intermediate its ends, the belt webbing 16 passes through a tongue assembly 22 and a D-ring 24 that is located above the retractor 21 and the anchor point 20. When the seat belt system 12 is not in use, the belt webbing 16 is wound on the retractor 21 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 21. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The pretensioner 32 is a known device which is electrically actuatable to remove slack from the torso portion 28 of the length of belt webbing 16 in order to hold the occupant of the vehicle seat 14 more securely in the vehicle seat. This can help to protect the vehicle occupant in the event of excessive rolling movement, that is, a rollover condition, of the vehicle.

The term "rolling movement" of a vehicle is used herein to refer to rolling or rotational movement of the vehicle relative to a selected first direction. In the illustrated embodiment, "rolling movement" of the vehicle is used to refer to rolling or rotational movement of the vehicle about an axis which extends parallel to a front-to-back direction 36 in the vehicle. The term "rollover condition" of a vehicle is used herein to refer to "rolling movement" of the vehicle of more than a predetermined threshold amount relative to the selected first direction. In the illustrated embodiment, a "rollover condition" of the vehicle is a condition in which the vehicle rolls, by more than 75°, in a direction about the axis which extends parallel to the front-to-back direction 36 of the vehicle.

The sensor 10 (FIG. 1) is mounted on the main tunnel 38 of the vehicle. The sensor 10 includes a movable member. In the illustrated embodiment, the movable member is a disk 40 (FIGS. 2–4) which is preferably made from a metal such as copper or brass. The disk 40 is fixed for movement with a pivot pin 42. The pivot pin 42 is supported in bearings 44 for pivotal movement about a pivot axis 46. The bearings are fixed in a portion of the vehicle structure indicated schematically at 48, such as a housing of the sensor 10 or a portion of the vehicle body 18.

The sensor 10 is mounted on the vehicle so that the pivot axis 46 extends parallel to a selected first direction about which, or relative to which, rolling movement of the vehicle is to be sensed. For example, in the illustrated embodiment, the sensor 10 senses rolling movement of the vehicle about the front-to-back direction 36 of the vehicle; therefore, the sensor is mounted on the vehicle so that the pivot axis 46 extends parallel to the front-to-back direction 36 of the vehicle. As a result, when the disk 40 pivots about the pivot axis 46, the disk moves relative to the vehicle in a direction transverse to the front-to-back direction 36 of the vehicle.

The disk 40 has a generally circular configuration centered on the pivot axis 46. An inertia mass or weight, indicated schematically at 60, is connected for movement with the disk 40 at a particular predetermined location on the circumference of the disk. The weight 60 could be a member which is made separately from the disk 40 and which is fixed for movement with the disk. Alternatively, the weight 60 could be a portion of the disk 40 which is formed as one piece with the disk. In either case, the weight 60 provides the disk with an unbalanced mass distribution relative to the pivot axis 46. As a result, the disk 40, under the influence of gravity (as indicated by the arrow 62 in FIG. 2), always maintains a predetermined orientation about the pivot axis 46 relative to the horizontal plane. Because of the influence of gravity, the weight 60 is usually disposed directly below the pivot axis 46.

The disk 40 has an opening in the form of a single arcuate slot 70 having a center of curvature coincident with the pivot axis 46. In the illustrated embodiment, the slot 70 has an angular extent of 75° on either side of a center point 72 of the slot. Thus, the slot 70 has a total circumferential extent of 150°. The slot 70 could, alternatively, have a different circumferential extent, depending on how much rolling movement of the vehicle is acceptable before the sensor is to output a control signal indicating that the vehicle has rolled over. The slot 70 is formed in the disk 40 at such a circumferential location that the center point 72 of the slot is normally disposed directly below (in the direction of gravitational force) the pivot axis 46. The portions 74 and 76 of the disk 40 disposed beyond the circumferential ends of the slot 70 are optically opaque.

The sensor 10 includes a light source or "optical transmitter" 80 which is disposed adjacent one side of the disk 40. The optical transmitter 80 is a known device, such as an LED, for transmitting a light beam 86 toward the disk 40 along an optical axis 82. The optical axis 82 extends parallel to the front-to-back direction 36 of the vehicle and parallel to the pivot axis 46. The sensor 10 also includes known means indicated schematically at 84 (FIG. 2) for fixing the optical transmitter 80 to the vehicle. The optical transmitter 80 is fixed in place at the same radial separation from axis 46 as the centerline of slot 70. Further, it is positioned such that, when the vehicle in the normal horizontal position, the transmitter 80 is directly below axis 46. Thus, the light beam 86 from the optical transmitter will pass through the slot 70 in the disk as long as the vehicle is upright.

The sensor 10 also includes an optical receiver 90. The optical receiver 90 is a known device, such as a phototransistor, for receiving the light beam 86 from the optical transmitter 80 and for providing an output signal having different states dependent upon whether, or how much of, the light beam is received. The sensor 10 also includes known means indicated schematically at 92 (FIG. 2) for mounting the optical receiver 90 on the vehicle for movement with the optical transmitter 80 relative to the disk and relative to the front-to-back direction 36 of the vehicle. The optical receiver 90 is fixed in position on the vehicle with its optical axis aligned coaxially with the optical transmitter 80. The optical receiver 90 is therefore positioned on the vehicle so that the light beam 86 from the optical transmitter 80, when it passes through the slot 70 in the disk 40, is received by the optical receiver. The sensor 10 is housed in a light-tight housing (not shown) so that only light from the transmitter 80 impinges on the optical receiver 90.

Both the optical transmitter 80 and the optical receiver 90 are, as a result, fixed for movement with the vehicle. Since the disk 40 is supported in bearings 44 fixed for movement with the vehicle about the front-to-back direction 36 of the vehicle, then the optical transmitter 80 and the optical receiver 90 move, together with the disk, about the front-to-back direction of the vehicle. During any such movement, however, the disk 40, because it is weighted, pivots about the pivot axis 46 so that the disk maintains its predetermined orientation relative to the horizontal plane.

A portion of the vehicle electric circuitry, indicated schematically by lead wires 98, extends between the optical receiver and an electronic control module (ECM) indicated schematically at 100 (FIG. 1). The lead wires 98 electrically connect the output of the optical receiver 90 with the ECM 100. Another portion of the vehicle electric circuitry, indicated schematically by lead wires 102, extends between, and electrically connects, the ECM 100 and the pretensioner 32.

Figure 5:
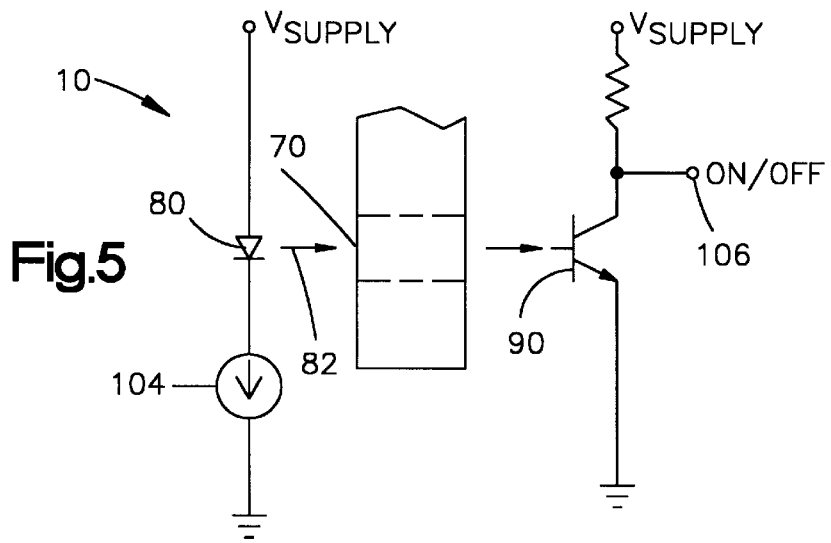
FIG. 5 is an electrical schematic diagram of parts of the sensor of FIG. 1.

Other portions of the electrical circuitry for the sensor 10 are illustrated schematically in FIG. 5. Electric current is supplied to the optical transmitter 80 by an electronically adjustable current source 104 under the control of a software control circuit. The light beam 82 generated by the optical transmitter 80 passes through the slot 70 in the disk 40 to the optical receiver 90. The on/off condition, or state, of the phototransistor 90 is monitored at 106 for logic transitions.

When the vehicle is upright on a horizontal surface, the light beam 86 from the optical transmitter 80 passes through the center point 72 of the slot 70. The light beam 86 is received by the optical receiver 90. The optical receiver 90 outputs an output signal, along the lead wires 98, which has a first state (e.g, a "low" or logic "0" level). The ECM 100 concludes from this that the vehicle is not in a rollover condition. As a result, the ECM 100 does not actuate the pretensioner 32.

When the vehicle experiences rolling movement in an amount less than 750 relative to the horizontal plane, the optical transmitter 80 and the optical receiver 90 move relative to the disk about the pivot axis 46. The light beam 86 from the optical transmitter 80 moves through an arc which is coincident with the slot 70 in the disk 40. The disk 40 rotates in its bearings, continually seeking an orientation where the mass 60 is vertically below the bearings. Thus, in effect, the transmitter 80 and the receiver 90 and indeed the entire vehicle rotate around the disk 40. Since the amount of roll is less than 75°, however, the light beam 86 still passes through the slot 70, albeit at a location spaced apart from the center point 72 of the slot. The light beam 86 is received by the optical receiver 90. The output signal on the lead wires 98 from the optical receiver 90 continues to have the first state, and the ECM 100 continues to be informed by the sensor that the vehicle is not in a rollover condition. The ECM 100 does not actuate the pretensioner 32.

When the vehicle experiences rolling movement in an amount greater than 75° relative to the horizontal plane, the optical transmitter 80 and the optical receiver 90 move relative to the disk 40 from the position shown in FIG. 3 to a position as shown in FIG. 4. As a result, the optical axis of the light beam 86 moves past the end of the slot 70, and the light beam 86 is partially or fully obscured by one of the blocking portions 74 or 76 of the disk 40.

Since the light beam 86 is at least partially interrupted by the disk 40, the amount of light reaching the optical receiver 90 is diminished. The electrical conductance of the receiver 90 thus decreases, causing the output signal on the lead wires 98 from the optical receiver 90 to the ECM 100 to assume a second state (e.g., a "high" or logic "1" state). The ECM 100 is thus informed that the vehicle is in a rollover condition, and reacts by actuating the pretensioner 32 (FIG. 1) to tighten the seat belt webbing 16. This tightening of the seat belt webbing 16 can help to maintain the vehicle occupant in the seat 14, in order to help protect the vehicle occupant during the rollover.

The sensor 10 could be used for controlling actuation of a vehicle safety device other than a single seat belt pretensioner. For example, the sensor 10 could be used for controlling multiple pretensioners each one of which is connected with a different seat belt system of a different seat in the vehicle. Alternatively, the sensor 10 could be used for controlling actuation of one or more different types of vehicle occupant safety devices, such as a roll bar or an inflatable vehicle occupant protection device of the type commonly known as an air bag.

The circuitry illustrated in FIG. 5 is used to test the sensor 10 for operativeness. The testing, or diagnostic, process takes from 10 microseconds to 100 microseconds. Although the sensor 10 is not able to sense a rollover condition during the testing period, the test period is so brief that proper rollover detection is not impaired.

Figure 10:
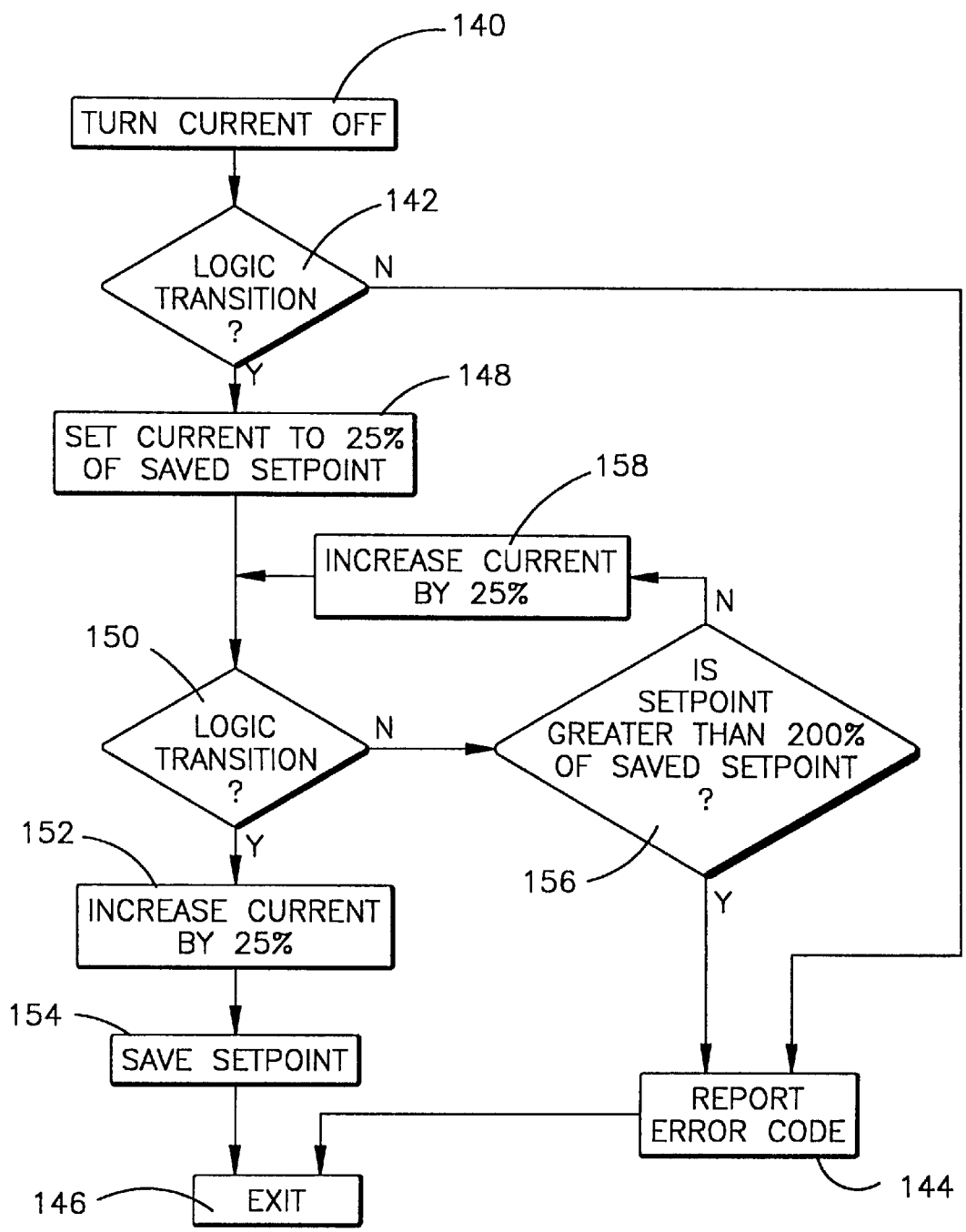
FIG. 10 is a flow chart of a diagnostic process for the sensors of FIGS. 1 and 6.

The testing of the sensor is performed under control of the ECM 100. The ECM 100 includes a microcomputer and a stored program for controlling the operation of the microcomputer. The ECM 100 typically performs a number of functions in addition to the diagnostic function described herein, hence the illustrated software normally is part of a much larger program performed by the ECM 100. The other portions of the program may take any conventional form and represent no part of the present invention. The microcomputer in the ECM 100 operates a "main loop" or "executive-level" program and the main loop executes the FIG. 10 diagnostic procedure at periodic intervals.

The diagnostic procedure (FIG. 10) begins with the sensor 10 in an active condition. That is, the optical transmitter 80 is sending an operational amount of light through the slot 70 in the disk 40 to the phototransistor 90. The amount of current being used by the optical transmitter 80 is saved in memory.

The current to the optical transmitter 80 is then turned off at Step 140 to start the diagnostic process. The output of the phototransistor 90 is checked at Step 142 for a logic transition. The presence of a logic transition indicates that the amount of light being received by the phototransistor 90 has dropped sufficiently to change the state of the phototransistor when the current is turned off at Step 140. If there is no logic transition at Step 142, the transmitter driver is not functioning. An error code is reported at Step 144 (resulting in an audible or visual warning to the driver), and the diagnostic program is exited at Step 146.

The purpose of Steps 148 through 158 is to identify the lowest current that will still cause the sensor to operate properly. If there is a logic transition at Step 142, the current to the optical transmitter 80 is then turned on at Step 148 and set to a level equal to 25% of the previously saved level. The output of the phototransistor 90 is checked at Step 150 for a logic transition. The presence of a logic transition at Step 150 with this first current level indicates that the amount of light being received by the phototransistor 90 is now sufficient to change the state of the phototransistor.

The current driving the transmitter 80 at this time is only 25% of the current used at the onset of the test period, hence, the receiver 90 will not be receiving adequate light to cause a logic transition in its output. The program will thus jump to Step 156 to determine whether the present transmitter current level is too high (e.g., more than twice the original current). This, also, will not be the case on the initial pass through block 156, hence the program will proceed to Step 158, where the transmitter current will be boosted by 25%. The test of block 150 will then be repeated, as will block 156 and block 158, until such time as either a logic transition appears at the output of receiver 80 or the current exceeds twice the original level. The program will detect the latter condition in block 156 and will shunt program flow to the "report error code" block 144. The program will detect the former condition in block 150, and will cause program flow to continue at Step 152.

Upon arriving at Step 152, the current will be at the minimum level necessary to create a transition at the output of the receiver 80. The current level is increased by 25% at Step 152 to provide a safety factor. The current level as thus set is saved at Step 154 in the system memory, and the diagnostic program is exited at Step 146.

The testing as described above of the sensor 10 functions to compensate for the effects of temperature and aging. Specifically, as the sensor 10 ages, the optical transmitter 80 may generate less light per unit of current supplied. Periodic testing of the operativeness of the sensor 10, in the manner described above, ensures that sufficient light is being sent to the optical receiver 80, even if the light output of the optical transmitter has lessened because of age. Also, when the optical transmitter is at extremely low temperatures, the optical transmitter may generate less light per unit of current supplied. Periodic testing of the operativeness of the sensor 10, in the manner described above, ensures that sufficient light is being sent to the optical receiver 80, even if the light output of the optical transmitter decreases due to temperature.

The amount of light generated by the optical transmitter 80 is limited by setting the current at an amount no more than 25% greater than is necessary to activate the optical receiver 90. This eliminates overly bright illumination of the optical transmitter 80 and thus can help to prolong the life of the optical transmitter.

It will be noted that the above testing is possible because the arcuate slot 72 in the disk 40 provides a normally unobscured path for the light beam 86 to follow from the optical transmitter 80 to the optical receiver 90 whenever the vehicle is not in a rollover condition. This enables testing of the sensor 10 whenever the vehicle is not in a rollover condition.

FIGS. 6–9 illustrate a second embodiment of the present invention. The sensor 10a (FIGS. 6–9) is generally similar to the sensor apparatus 10 (FIGS. 2–5), and so similar reference numerals are used in FIGS. 6–9 to designate similar parts of FIGS. 2–5, with the suffix "a" added to avoid confusion.

In the sensor 10a, the disk 40a is a "pie" or sector-shaped element. That is, the disk 40a has the configuration of a geometrical figure bounded by two radii and the included arc of a circle. In this case, the radii constitute the opposite side edges 41 and 43 of the disk 40a and the included arc constitutes an arcuate outer peripheral edge surface 45 of the disk. The disk 40a is fixed for rotation with a pivot pin 42a about a pivot axis 46a extending parallel to a front-to-back direction 36a of the vehicle. The center of curvature of the edge surface 45 is coincident with the axis 46a.

The disk 40a has an optically reflective surface 110 presented toward an optical transmitter 80a. The weight of the disk 40a and its off-center-of-gravity mounting ensures that the reflective surface 110 hangs vertically under the pivot axis 46a, under the influence of gravity, regardless of the orientation of the vehicle relative to the horizontal plane.

An optical receiver 90a is disposed adjacent to the optical transmitter 80a, on the side of the disk 40a toward which the reflective surface 110 is presented. The optical transmitter 80a and the optical receiver 90a are fixed in position relative to the pivot axis 46a of the disk 40a.

When the vehicle in which the sensor 10a is mounted is upright (i.e., not in a rollover condition), the reflective surface 110 on the disk 40a (FIG. 5) is in the path of the light beam 86a from the optical transmitter 80a. The light beam 86a strikes the reflective surface 110 on the disk 40a. The light beam 86a reflects from the reflective surface 110 of the disk 40a back to the optical receiver 90a. The output signal from the optical receiver has a first state from which the ECM 100 (not shown in FIGS. 5–7) determines that the vehicle is not in a rollover condition.

When the vehicle is in a rollover condition, the optical transmitter 80a and the optical receiver 90a move relative to the disk 40a, from the position shown in FIG. 5 to the position shown in FIG. 6. The reflective surface 110 on the disk 40a, which maintains a predetermined orientation relative to the ground surface on which the vehicle is disposed, is no longer in the path of the light beam 86a. The light beam 86a is not reflected back to the optical receiver 90a. The output signal from the optical receiver 90a to the ECM 100 has a second state from which the ECM determines that the vehicle is in a rollover condition. The ECM 100 can actuate a vehicle occupant safety device (not shown in FIGS. 5 and 6) such as the pretensioner 32 of FIG. 1, in response.

The sensor 10a optionally includes a damping mechanism indicated schematically at 120 (FIG. 7). The damping mechanism 120 controls small vibrations and other minor movements of the disk 40a about the pivot axis 46a. The damping mechanism 120 impedes such motion without preventing the substantial types of motion experienced in a rollover condition of the vehicle. The damping mechanism 120 could take one of many different forms, such as a magnetic brake or a dashpot which induces a viscous drag on the disk 40a. A damping mechanism such as the damping mechanism 120 could be incorporated into the sensor 10 shown in FIGS. 1–4.

Figure 9:
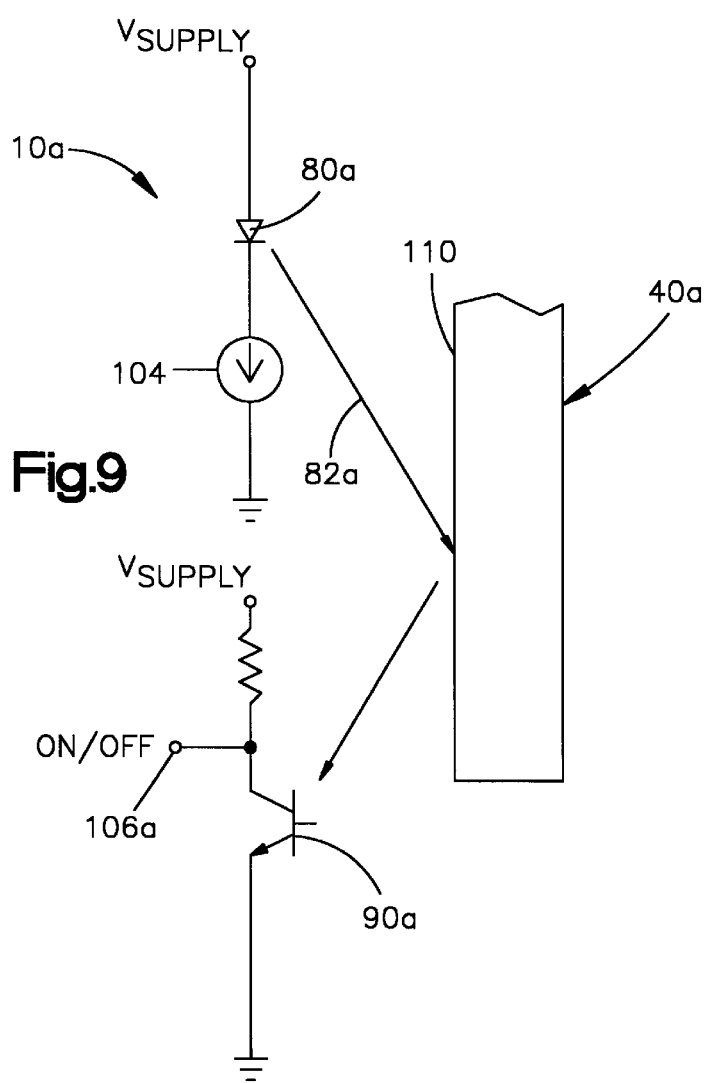
FIG. 9 is an electrical schematic diagram of parts of the sensor of FIG. 6.

The electrical circuitry for the sensor 10a is illustrated partially at FIG. 9. The electrical circuitry for the sensor 10a is identical to the electrical circuitry for the sensor 10 (FIGS. 1–4). The light beam 86a generated by the optical transmitter 80a is reflected by the reflective surface 110 on the disk 40a to the optical receiver 90a. The on/off condition, or state, of the optical receiver 90a is monitored for logic transitions, in the manner described above, to test the operativeness of the sensor 10a.

The diagnostic process for the sensor 10a is, accordingly, similar to the diagnostic process for the sensor 10. Whenever the vehicle is not in a rollover condition, light from the optical transmitter 80a is reflected by the disk 40a, to the optical receiver 90a. The presence or absence of a logic transition upon turning the optical transmitter 80a on or off, and the amount of current being sent to the optical transmitter 80a, are monitored, to test and set the sensor 10a.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for providing a control signal indicative of a rollover condition of a vehicle which is disposed on a ground surface, said apparatus comprising:

an optical transmitter for providing a light beam extending in a first direction;

an optical receiver for receiving the light beam from said optical transmitter;

a disk having an opening for enabling the light beam from said optical transmitter to be directed to said optical receiver and having portions for preventing at least a part of the light beam from being directed to said optical receiver;

means for supporting said optical transmitter and optical receiver on the vehicle for movement relative to said disk and transverse to said first direction in response to rolling movement of the vehicle relative to said first direction;

means for supporting said disk on the vehicle for movement relative to the vehicle and transverse to said first direction in response to rolling movement of the vehicle relative to said first direction in an amount above a predetermined threshold value to prevent at least a part of the light beam from being directed to said optical receiver;

an inertia mass connected with said disk to maintain said disk in a predetermined orientation relative to the ground surface on which the vehicle is disposed when the vehicle is in a rollover condition;

said opening in said disk enabling the light beam from said optical transmitter to be directed to said optical receiver whenever the vehicle is not in a rollover condition; and said disk is supported on the vehicle for pivotal movement about an axis, said opening comprising a single arcuate slot centered on said axis and extending between end boundary portions of said disk, said portions of said disk for preventing at least a part of the light beam from being directed to said optical receiver comprising said end boundary portions of said disk.

2. An apparatus as set forth in claim 1 wherein said optical transmitter is fixedly mounted on the vehicle relative to said axis so that the light beam is directed through said slot in said disk when the vehicle is not in a rollover condition.

3. An apparatus for providing a control signal indicative of a rollover condition of a vehicle which is disposed on a ground surface, said apparatus comprising:

an optical transmitter for providing a light beam extending in a first direction;

an optical receiver for receiving the light beam from said optical transmitter;

a disk having an opening for enabling the light beam from said optical transmitter to be directed to said optical receiver and having portions for preventing at least a part of the light beam from being directed to said optical receiver;

means for supporting said optical transmitter and optical receiver on the vehicle for movement relative to said disk and transverse to said first direction in response to rolling movement of the vehicle relative to said first direction;

means for supporting said disk on the vehicle for movement relative to the vehicle and transverse to said first direction in response to rolling movement of the vehicle relative to said first direction in an amount above a predetermined threshold value to prevent at least a part of the light beam from being directed to said optical receiver;

an inertia mass connected with said disk to maintain said disk in a predetermined orientation relative to the ground surface on which the vehicle is disposed when the vehicle is in a rollover condition;

said opening in said disk enabling the light beam from said optical transmitter to be directed to said optical receiver whenever the vehicle is not in a rollover condition; and means for testing the operativeness of said optical transmitter and said optical receiver whenever the vehicle is not in a rollover condition.

4. An apparatus as set forth in claim 3 wherein said means for testing includes means for controlling the amount of light output of said optical transmitter in response to said testing of said optical transmitter and said optical receiver.

5. An apparatus as set forth in claim 4 wherein said means for controlling the amount of light output of said optical transmitter in response to said testing of said optical transmitter and said optical receiver, comprises means for turning said optical transmitter off and on, means for monitoring logic transitions at said optical receiver, and means for setting the amount of current supplied to said optical transmitter.

6. An apparatus for providing a control signal indicative of a rollover condition of a vehicle which is disposed on a ground surface, said apparatus comprising:

an optical transmitter for providing a light beam extending in a first direction;

an optical receiver for receiving the light beam from said optical transmitter;

a movable member having various orientations relative to the vehicle and relative to said optical transmitter and optical receiver and relative to a first direction, said movable member when in a first orientation enabling the light beam from said optical transmitter to be directed to said optical receiver, said movable member when in a second orientation preventing at least a part of the light beam from being directed to said optical receiver;

means for supporting said optical transmitter and said optical receiver on the vehicle for movement relative to said movable member and transverse to said first direction in response to rolling movement of the vehicle relative to said first direction;

means for supporting said movable member on the vehicle for movement between said first and second orientations in a direction transverse to said first direction in response to rolling movement of the vehicle relative to said first direction in a n amount above a predetermined threshold value;

an inertia mass connected with said movable member to maintain said movable member in a predetermined orientation relative to the ground surface on which the vehicle is disposed;

means for testing the operativeness of said optical transmitter and said optical receiver whenever the vehicle is not in a rollover condition; and said means for testing includes means for controlling the amount of light output of said optical transmitter in response to said testing of said optical transmitter and said optical receiver.

7. An apparatus as set forth in claim 6 wherein said means for controlling the amount of light output of said optical transmitter in response to said testing of said optical transmitter and said optical receiver, comprises means for turning said optical transmitter off and on, means for monitoring logic transitions at said optical receiver, and means for setting the amount of current supplied to said optical transmitter.

8. An apparatus for providing a control signal indicative of a rollover condition of a vehicle which is disposed on a ground surface, said apparatus comprising:

an optical transmitter for providing a light beam extending in a first direction;

an optical receiver for receiving the light beam from said optical transmitter;

a movable member having various orientations relative to the vehicle and relative to said optical transmitter and optical receiver and relative to a first direction, said movable member when in a first orientation enabling the light beam from said optical transmitter to be directed to said optical receiver, said movable member when in a second orientation preventing at least a part of the light beam from being directed to said optical receiver;

means for supporting said optical transmitter and said optical receiver on the vehicle for movement relative to said movable member and transverse to said first direction in response to rolling movement of the vehicle relative to said first direction;

means for supporting said movable member on the vehicle for movement between said first and second orientations in a direction transverse to said first direction in response to rolling movement of the vehicle relative to said first direction in an amount above a predetermined threshold value;

an inertia mass connected with said movable member to maintain said movable member in a predetermined orientation relative to the ground surface on which the vehicle is disposed;

means for testing the operativeness of said optical transmitter and said optical receiver whenever the vehicle is not in a rollover condition; and said movable member comprises a disk and wherein said means for supporting comprises means for supporting said disk on the vehicle for pivotal movement relative to the vehicle about a pivot axis, said disk including a single slot having an arcuate configuration centered on said pivot axis, said disk having blocking portions which form circumferential boundaries of said slot and at least one of which is disposed in the path of the light beam from said optical transmitter when said movable member moves into the second orientation relative to the vehicle.

* * * * *